Figure 1:
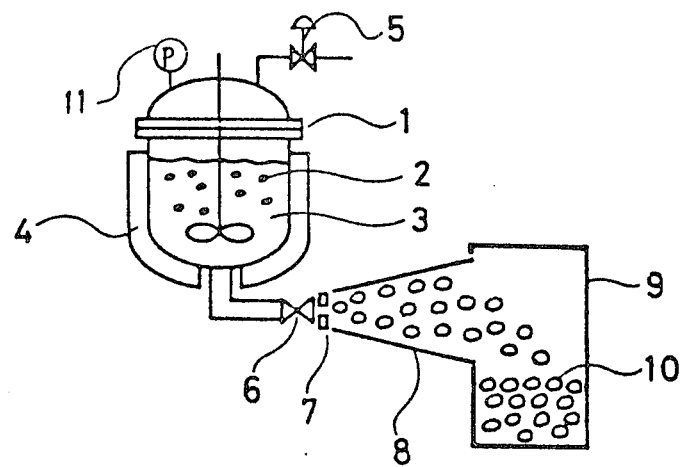

United States Patent [19]

Senda et al.

[11] 4,448,901
[45] May 15, 1984

[54] EXPANDED PARTICLES OF POLYOLEFIN RESIN AND PROCESS FOR PRODUCING SAME

[75] Inventors: Kenichi Senda, Hirakata; Masao Ando, Toyonaka; Kyoichi Nakamura, Settsu; Kiyoshi Mori, Kakogawa; Tatehiko Nishida, Ibaraki, all of Japan

[73] Assignee: Kanegafuchi Kagaku Kogyo Kabushiki Kaisha, Osaka, Japan

[21] Appl. No.: 494,394

[22] Filed: May 13, 1983

[30] Foreign Application Priority Data

| May 13, 1982 | [JP] | Japan | 57-81137 |
| May 13, 1982 | [JP] | Japan | 57-81138 |
| May 13, 1982 | [JP] | Japan | 57-82097 |
| May 14, 1982 | [JP] | Japan | 57-82096 |
| Aug. 13, 1982 | [JP] | Japan | 57-141573 |

[51] Int. Cl.³ .............................................. C08J 9/18
[52] U.S. Cl. .............................. 521/60; 264/DIG. 9; 264/53; 521/56; 521/58
[58] Field of Search ...................... 521/60, 56, 58; 264/DIG. 9

[56] References Cited

U.S. PATENT DOCUMENTS 4,247,650  1/1981  Schimizu et al. .................. 521/58
4,366,263  12/1982  Sato et al. ........................ 521/56

*Primary Examiner*—Morton Foelak
*Attorney, Agent, or Firm*—Armstrong, Nikaido, Marmelstein & Kubovcik

[57] ABSTRACT

The mixture of water and the polyolefin resin particles impregnated with a volatile blowing agent are released from the interior of the pressure-resistant container under a constant temperature and constant pressure preferably keeping the partial pressure of the blowing agent constant, through at least one orifice having an area of 0.07 to 300 mm², into a low-pressure zone.

This invention gives various advantages when applied to the practical process resulting in expanded particles with superior properties which are free of blocking and remarkably uniform in the degree of expansion, and are useful for molding.

7 Claims, 2 Drawing Figures

EXPANDED PARTICLES OF POLYOLEFIN RESIN AND PROCESS FOR PRODUCING SAME

The present invention relates to expanded particles of polyolefin resin which can be made into a molded product when heated within a mold with water vapor or like heating medium and to a process for producing such particles. More particularly, the invention relates to expanded particles of polyolefin resin which will not agglomerate into blocks, have a uniform and minute cellular structure and are greatly reduced in variations in the degree of expansion, and to a process for producing the same.

Expanded particles of polyolefin resin like polyethylene resin useful for molding are prepared most widely by heating resin particles containing a volatile blowing agent or thermally decomposable blowing agent. However, this process involves difficulty in obtaining highly expanded particles and further has the drawback that the expanded particles obtained vary greatly in the degree of expansion and are prone to shrinkage. It is also known to produce expanded resin particles by dispersing polyolefin resin particles containing a volatile blowing agent in water within a pressure-resistant container, agitating the dispersion at a high temperature and high pressure and thereafter releasing the dispersion into a low-pressure zone, as disclosed in West German Laid-Open Patent Publication No. 2107683, Published Examined Japanese Patent Application No. 1344/1981, etc. This process is efficient in that the starting resin particles can be impregnated with the blowing agent and expanded continuously within the same apparatus, but has problems in that the resin particles are liable to agglomerate within the container since the particles containing the blowing agent are subjected to a high temperature, and that the expanded particles are prone to blocking since the resin particles are released into a low-pressure zone at a high speed. Moreover, the process has the drawback that the expanded particles tend to vary greatly in the degree of expansion and to be uneven in cellular structure among the particles, which impairs the moldability and fails to obtain products with satisfactory properties when molded.

We have carried out intensive research to overcome such drawbacks of the latter process and accomplished a process which is characterized in that a mixture of resin particles and water is released from a pressure-resistant container into a low-pressure zone through an orifice of small diameter while strictly controlling the internal temperature and pressure of the container during the release. The orifice of small diameter through which the particles are released prevents the particles from contact with one another during the passage therethrough and controls the the speed of release, consequently preventing them from blocking during the release. Furthermore, the control of the internal pressure of the container during the release eliminates variations in the rate of release to give expanded particles which are uniform in the degree of expansion and also in cellular structure among the particles. The release of particles through the small orifice results in the advantage that the interior of the container can be maintained under the controlled pressure easily during the release.

Stated more specifically, the present invention provides a process for producing expanded parricles of . a polyolefin resin characterized by dispersing polyolefin resin particles 0.25 to 10 mm in particle size and a volatile blowing agent in water in the presence of a dispersant within a pressure-resistant container, heating the mixture at a temperature within the range of from the melting point of crystals of the resin minus 25° C. to the melting point plus 10° C. to impregnate the resin particles with the blowing agent, and releasing the mixture of the particles and water into a low-pressure zone through at least one orifice having an area of 0.07 to 300 mm$^2$ while maintaining the interior of the container at a constant temperature and constant pressure. The invention also provides such expanded particles of polyolefin resin obtained by the process.

Examples of polyolefin resins useful for the present invention are low-density polyethylene, straight-chain low-density polyethylene, medium-density polyethylene, high-density polyethylene, ethylene-vinyl acetate copolymer, polypropylene, ethylene-propylene random copolymer, ethylene-propylene block copolymer, ethylene-propylene-butene terpolymer, etc. These resins are used singly, or at least two of them may be used in admixture. Ultraviolet absorbers, antistatic agents, thermal stabilizers, flame retardants, coloring agents and fillers may be admixed with such resins. Further, polyolefin resins having crosslinked bonds which are produced with a peroxide or by irradiation with electron rays, can also be used.

The process of this invention enables to produce expanded polyolefin resin particles with uniform cell structure among the particles obtained, by the strict control of the internal pressure of the container and with use of small orifice. However, it is further desired that the polyolefin resin particles of the invention contain 0.01 to 5.0 parts by weight, preferably 0.01 to 1.0 part by weight, most preferably 0.01 to 0.5 part by weight, of an inorganic nucleating agent per 100 parts by weight of the resin. The inorganic nucleating agent acts to give expanded resin particles having fine and uniform cells in each of the particles which are 0.05 to 0.5 mm in diameter. With less than 0.01 part by weight of the inorganic uncleating agent present, it is difficult to obtain fine uniform cells, whereas more than 5.0 parts by weight of the agent, if used, will not produce a correspondingly enhanced effect. Examples of useful inorganic nucleating agents are talc, silica, calcium silicate, calcium carbonate, aluminum oxide, titanium oxide, kieselguhr, clay, sodium bicarbonate, barium sulfate, bentonite, etc., of which talc and silica are preferable to use.

The polyolefin resin particles to be expanded are preferably 0.25 to 10 mm, more preferably 0.5 to 6 mm, in particle size to assure favorable molding of the resulting product.

Examples of volatile blowing agents useful for the present invention are hydrocarbons and hydrocarbon halides having a boiling point of −50° to 120° C., such as propane, butane, pentane, hexane, heptane, cyclopentane, cyclohexane, monochloromethane, dichloromethane, monochloroethane, trichloromonofluoromethane, dichlorodifluoromethane, dichloromonofluoromethane, trichlorotrifluoroethane, dichlorotetrafluoroethane, etc. These compounds are used singly, or at least two of them may be used in admixture. The amount of the volatile blowing agent to be charged in is determined in accordance with the kind of the resin, the kind of the blowing agent, the desired degree of expansion and the ratio of the resin within the pressure-resistant container to the vapor-phase space of the container. With the present invention, the amount of charge is so determined that the polyolefin resin will be impregnated usually with 5 to 40 parts by weight of the blowing agent.

When dispersing the polyolefin resin particles in water according to the invention, it is desired to use a small amount of dispersant to prevent the resin particles from fusing to one another during heating. Examples of useful dispersants are water-soluble high polymers such as polyvinyl alcohol, methylcellulose and N-polyvinylpyrrolidone; fine powders of inorganic substances which are sparingly soluble in water, such as calcium phosphate, magnesium pyrophosphate and zinc carbonate; and mixtures of such fine powders of inorganic substances and a small amount of sodium alkylbenzenesulfonate, sodium α-olefinsulfonate, sodium alkylsulfonate or like anionic surfactant. It is perferable to use inorganic substances since the use of water-soluble high polymers involves problems of water pollution. However, if the inorganic substance is used in a large amount, the expanded particles obtained will not thermally adhere to one another effectively when molded, so that it is preferred to use a small amount of anionic surfactant conjointly with the inorganic substance. In this case, 0.1 to 3 parts by weight of the fine powder of sparingly water-soluble inorganic substance and 0.001 to 0.5 part by weight of anionic surfactant are preferably used per 100 parts by weight of the resin.

According to the present process, the mixture of the above-mentioned materials is heated at a temperature not lower than the softening point of the polyolefin resin with the volatile blowing agent contained in the resin. The range of proper heating temperatures varies with the kind of polyolefin resin and the kind of volatile blowing agent. In actually practicing the present invention, however, the heating temperature is determined within the temperature range of from the melting point of crystals of the resin minus 25° C. to the melting point plus 10° C., preferably from the melting point minus 20° C. to the melting point plus 5° C. For example, in the case of a low-density polyethylene which is 110° C. in the melting point of its crystals, the proper heating temperature is in the range of 85° to 120° C. In the case of ethylene-propylene random copolymer having an ethylene content of 4.5% by weight and a crystal melting point of 135° C., the proper heating temperature is in the range of 110° to 145° C. If the heating temperature is lower than the specified range, a greatly reduced degree of expansion will result, whereas if the temperature is too high, the expanded particles obtained have a lower ratio of closed cells, hence undesirable.

According to the present invention, the mixture of water and expandable particles of polyolefin resin which are subjected to heat and increased pressure and remain unexpanded within the container is then released into a low-pressure zone through at least one orifice having an area of 0.07 mm² to 300 mm². If the orifice is too small, the particles are unable to pass therethrough and plug up the orifice, whereas if it is too large, a large number of expandable particles, remaining unexpanded under pressure but softened by heating, are released into the low-pressure zone through the orifice at the same time to thermally adhere to one another during passage through the orifice or thereafter (when expanding), thus undergoing blocking. The size of orifice or orifices to be used in this invention is 0.07 to 300 mm² in area, and is preferably 0.28 to 120 mm². The size of orifice should theoretically be at least about as large as the size of the polyolefin resin particles used and actually be at least 1.2 times as large as the size of the particles. However, in this invention, it is desired that the size of orifice should be as small as possible. Thus, the upper limit of the size of olifice of 300 mm² was determined so as to be twice as large as 10 mm of the size of the largest polyolefin resin particles to be employed in this invention. When such a small olifice is used for passing the resin particles therethrough into the low-pressure zone, the resin particles can be passed through the orifice without contacting one another and can be released in a smaller number per unit time with reduced likelihood of colliding with one another. Consequently this will reduce the likelihood of thermal adhesion (blocking) of the expanded particles. The orifice is usually circular or elliptical in shape but can be polygonal in some cases. The orifice can be provided, for example, by disposing a pressure-resistant orifice plate having at least one orifice at the rear end of a release valve with use of flanges.

While it is critical as one of the features of the invention to maintain the interior of the pressure-resistant container at a specified pressure during the release of particles as will be described below, the use of small orifice, 0.07 to 300 mm² in area, leads to the advantage that the container internal pressure is controllable with ease.

According to the present invention, the internal temperature and pressure of the container must be kept constant when the mixture of resin particles and water is released into a low-pressure zone.

The internal temperature, if varying, greatly varies the degree to which the resin particles are expanded. Thus it is required to control the temperature as strictly as possible. For example, the variation of the temperature during the period from the start of release until the end of release should preferably be not more than 5° C., more preferably not more than 3° C. The temperature is easily controllable, for example, when the pressure-resistant container is provided with a usual jacket.

As the mixture of resin particles and water is released from the container, the upper space within the container increases to lower the internal pressure of the container and reduce the degree of expansion of the particles released, further permitting expansion within the container to hamper the release of particles, so that there is a need to maintain the internal pressure of the container at a constant level during the release.

It may appear useful to introduce $N_2$, air or like inert gas for the pressure maintenance, but even if such inert gas is used for this purpose, the reduction in the degree of expansion of the resulting particles is still great.

We have conducted research to solve this problem and found that the reduction of the expansion degree is attributable to the fact that as the mixture of resin particles and water is released from the container, the interior upper space (vapor-phase space) of the container enlarges to decrease the partial pressure of the volatile blowing agent in the interior space and permit the resin to release the blowing agent, consequently decreasing the amount of the blowing agent impregnating the resin, even if the internal pressure is maintained by $N_2$, air or like inert gas.

Accordingly expanded particles can be obtained with a minimized variation in the degree of expansion by keeping the total internal pressure and the partial pressure of the blowing agent constant. This can be realized for example, by decreasing the interior upper space of the container by an amount corresponding to the increase of the space to maintain the space at a constant volume, or by supplying the volatile blowing agent to the container from outside in corresponding relation to the increase of the space. The need to supply the blowing agent arises when the interior space of the container is not saturated with the agent as usually and the partial pressure of the blowing agent in the container decreases with the release of particles. Thus, when the interior space of the container is suturated with the blowing agent and excessive blowing agent is exist in liquid, it is not always necessary to supply the blowing agent. In the case of supplying the volatile blowing agent, the blowing agent can be introduced into the container from outside (1) in the form of a vapor, or (2) in the form of a liquid. The latter mode of supply is simpler and is therefore more preferable. When introduced into the container in the mode (2), the volatile blowing agent immediately vaporizes. The agent may be introduced in continuously or intermittently, depending upon the acceptable variation of degree of expansion of the expanded particles to be obtained. For example, it is introduced through an adjusting valve while so controlling the pressure that the total pressure within the container will be kept constant. The expression "to keep the pressure constant" as used herein also includes to adjust and maintain the pressure within a range according to the range of permissible variations in the expansion degree of expanded particles.

When the mixture of resin particles and water is released from the pressure-resistant container into a low-pressure zone, the particles usually immediately expand and thefore spread out through an angle of discharge. Accordingly, in case that a duct or the like is disposed immediately to the rear of the discharge orifice, it must be so shaped as to have a space which is larger than the path of discharge of particles which spread out through the angle of discharge. If a duct of small diameter or the like is disposed to the rear of the discharge orifice, the duct will be plugged up with expanded particles, or the expanded particles obtained include a large amount of agglomerates of particles.

According to the present invention, the mixture of resin particles and water is released through an orifice which is as small as 0.07 to 300 mm² in area, so that the angle of discharge of particles is small, and the distance of scattering of the particles is short since they are released at a reduced speed. Thus the path of discharge is compact in its entirety.

With the present process, therefore, the duct or container to be provided to the rear of the release orifice can be compact.

Figure 2:
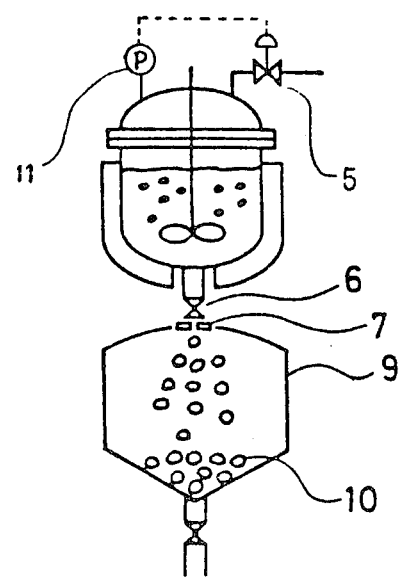

FIG. 1 and FIG. 2 are diagrams showing examples of apparatus useful for the process of the present invention.

Apparatus for practicing the present process will be described briefly with reference to these drawings, in which like parts are referred to by like reference numerals. FIG. 1 shows a pressure-resistant container 1 which is equipped with a heater (jacket) 4, a pressure control valve 5 and a pressure gauge 11. Polyolefin resin particles 2 as admixed with water 3 are heated in the container 1 under increased pressure and impregnated with a blowing agent. The mixture of resin particles and water is released through a dicharge valve 6 and an orifice plate 7, such as the one already stated, into a tank 9, whereupon the particles are made into expanded particles 10. While the orifice may be open to the atmosphere (free space), a flaring duct 8 is provided immediately in the rear of the orifice plate 7 in FIG. 1 to render the apparatus compact. The duct 8 has a space larger than the path of discharge of the particles to be released and expanded. Alternatively a usual cylindrical duct is usable insofar as it has a sufficiently larger inside diameter. In FIG. 2, the orifice is open to a tank 9 having a space larger than the path of discharge of the particles to be released and expanded. The tank 9 is useful for storing the expanded particles.

The process of the present invention described above gives expanded particles of polyolefin resin which are low in density (high in the degree of expansion), very uniform in density distribution and also uniform in cellular structure among the particles and thus gives articles with superior properties when molded. The expanded particles of polyolefin resin obtained by the present invention are usually used for molding. Useful for molding are expanded resin particles which are 0.01 to 0.2 g/cc in density. Those having a density of 0.01 to 0.05 g/cc are suited for preparing shock-absorbing materials, packaging materials, heat-insulating materials, etc., while those having a density of 0.05 to 0.2 g/cc are suitable for structural materials, containers, heat-insulating materials, etc.

According to the process of this invention, it is possible to produce expanded particles having a high ratio of closed cells, i.e., at least 65%, usually at least 80%, because the present invention assures a high closed cell ratio by strictly controlling the heating temperature within the range of from the crystal melting point of polyolefin resin minus 25° C. to the crystal melting point plus 10° C. to thereby control the amount of blowing agent impregnating the resin and the viscoelasticity thereof. The expanded particles are almost free of variations in closed cell ratio because the expandable resin particles are released through a small orifice while the partial pressure of volatile blowing agent is being maintained at a constant level in the vapor phase of the pressure-resistant container during the release. Accordingly the particles can be fused together effectively and are less prone to shrinkage when molded, giving expanded molded articles which have excellent properties. As mentioned above, the process of this invention enables to produce uniform expanded particles with superior properties industrially advantageously, and can also be applied in industrially manufacturing expanded particles of non-crosslinked polyolefin resin which generally has a difficulty to be formed in expanded articles by conventional foaming processes because of the narrow range of temperature giving the viscoelasticity suitable for foaming.

The invention will be further described with reference to an ethylene-propylene random copolymer as an example, expanded particles of which have better moldability than the polypropylene homopolymer when subjected to the conventional mold forming process hereinafter described and gives a useful expanded molded product having higher rigity, strength and heat resistance than polyethylene. Preferably the ethylene-propylene random copolymer has an ethylene content of 1 to 15% by weight and MI (melt flow index, JIS K 6758) of 0.1 to 40. When having an ethylene content of less than 1% by weight, the copolymer resembles polypropylene homopolymer, failing to have the remarkable advantage of being moldable under widely varying conditions, whereas when exceeding 15% by weight in ethylene content, the copolymer is unable to have high rigidity and strength characteristic of polypropylene and resembles polyethylene. With MI of less than 0.1, the copolymer exhibits poor fluidity when expanding and encounters difficulty in expansion. With MI exceeding 40, the resin conversely exhibits exceedingly high fluidity, failing to expand to a high degree, and becomes susceptible to shrinkage after expansion. In Example 7, an ethylene-propylene random copolymer having an ethylene content of 4.5% by weight and MI of 9 is used to afford expanded particles having a high degree of expansion and very small in the variation of density.

As described above, the process of the present invention gives expanded particles of polyolefin resin which are free of blocking, high in closed cell ratio, uniform and fine in cell structure and minimized in the variation of degree of expansion.

The expanded particles thus prepared can be molded by known methods. For example, the expanded particles obtained are placed into a mold as they are, or after having been aged and dried for a suitable period of time, with or without expanding ability subsequently given, and are thereafter heated with water vapor or like heating medium for molding. As a method of imparting expanding ability to the expanded particles, an increased internal cell pressure can be given to the particles by impregnating their cells with $N_2$, air or like inorganic gas, or by compressing the particles. Another method is also useful in which the internal space of the mold is reduced by compression for molding, with the mold filled with expanded particles as prepared or given expanding ability. In this way, a molded product is obtained which is uniform and fine in cellular structure, uniform in particle size, attractive in appearance and uniform in density distribution and in which the particles are effectively fused together. The heating conditions for molding differ with the kind of the resin. When water vapor is used as the heating medium, the expanded material can be heated for about 5 seconds to 3 minutes with water vapor having a temperature of 105 to 160° C.

The term "closed cell ratio" as used herein refers to the ratio of closed cells (cells separated and closed by interposed partitions) to the whole cells which is calculated from the following equation.

$$\text{Closed cell ratio (\%)} = \frac{v - \frac{w}{d}}{V} \times 100$$

wherein
  d: density of the resin (g/cm$^3$),
  w: weight of the specimen of expanded particles (g),
  V: volume of the specimen (volume measured in submerged state, cm$^3$)
  v: true volume of the specimen as measured by specific gravity meter of air comparison type (e.g. Model 930, product of Toshiba Beckman Co., Ltd.)

The present invention will be described below in greater detail with reference to the following examples, in which the parts are all by weight.

EXAMPLE 1

Powdery talc (0.05 part) was admixed with 100 parts of ethylene-propylene random copolymer (0.90 g/cm$^3$ in density, in MI, about 4.5% by weight in ethylene content), and the mixture was extruded into pellets about 2 mm in size. One hundred parts of pellets (700 g) were dispersed in 300 parts of water in a 4-liter pressure-resistant container equipped with a stirrer, in the presence of 0.5 part of powdery basic calcium tertiary phosphate and 0.025 part of sodium dodecylbenzenesulfonate serving as dispersants. Fifty-five parts of dichlorodifluoromethane was added to the dispersion with stirring, and the mixture was heated to 136° C. While subsequently maintaining the internal pressure of the container at 30 kg/cm$^2$ gauge with $N_2$, the mixture of pellets and water was released into the atmosphere through a circular orifice, 3 mm in diameter (7.07 mm2), in an orifice plate attached to the rear end of a release valve 25 mm in inside diameter, whereby expanded particles were obtained. The release of the mixture took about 11 seconds. The particles were free of any blocking, 94% in closed cell ratio, 0.021 g/cm$^3$ in density, and up to 0.2 mm and uniform in cell diameter.

EXAMPLE 2

The same procedure as in Example 1 was repeated with the exception of using an ethylene-propylene random copolymer 30 in MI and about 3.5% by weight in ethylene content and heating the mixture at a temperature of 141° C. The expanded particles obtained were free of any blocking, 93% in closed cell ratio, 0.022 g/cm$^3$ in density, and up to 0.2 mm and uniform in cell diameter.

EXAMPLE 3

The same procedure as in Example 1 was repeated with the exception of using 40 parts of n-butane as a volatile blowing agent, admixing 0.3 part of talc with the resin and heating the mixture at a temperature of 115° C. The expanded particles obtained were free of any blocking, 91% in closed cell ratio, 0.016 g/cm$^3$ in density, and up to 0.2 mm and uniform in cell diameter.

EXAMPLE 4

The procedure of Example 1 was repeated with the exception of using a straight-chain low-density polyethylene (0.920 in density, 2.1 in MI) as the resin, adding 0.01 part of talc, using 60 parts of dichlorodifluoromethane and heating the mixture at a temperature of 117° C. The expanded particles obtained were free of any blocking, 94% in closed cell ratio, 0.034 g/cm$^3$ in density, and up to 0.2 mm and uniform in cell diameter.

COMPARISON EXAMPLE 1

The procedure of Example 1 was repeated except that the mixture of pellets and water was released directly from the release valve 25 mm in inside diameter (491 mm2) without using the orifice plate. The expanded particles included blocks of about 2 to about 10 particles.

EXAMPLE 5

The procedure of Example 1 was repeated with the exception of using a flaring duct measuring 50 cm in inside diameter of its rear end and 150 cm in length and disposed in the rear of the orifice plate, and a storage container of metal netting provided at the rear end of the duct for collecting the pre-expanded particles (see FIG. 1 ). The pre-expanded particles obtained were free of any blocking, 94% in closed cell ratio, 0.023 g/cm$^3$ in density, and up to 0.2 mm and uniform in cell diameter.

EXAMPLE 6 AND COMPARISON EXAMPLE 2

The procedure of Example 1 was repeated with the exception of using an inorganic nucleating agent (powdery talc or powdery silica) in varying amounts (Experiment Nos. 1 to 7) or not using any nucleating agent (Comparison Example 2) as listed in Table 1. The pre-expanded particles obtained were free of any blocking and had the densities and cell diameters listed in Table 1. Those prepared with use of talc or silica were very small and uniform in cell diameter, whereas those prepared without using any nucleating agent were larger and uneven in cells in a particle.

TABLE 1

| Exp. No. | Nucleating agent (part) | Pre-expanded particles | | |
|---|---|---|---|---|
| | | Density $(g/cm^3)$ | Cell diam.[1] | Uniformity of cells in a particle |
| (Ex. 1) | Talc (0.05) | 0.021 | A | Uniform |
| 1 | Talc (0.02) | 0.025 | A | " |
| 2 | Talc (0.1) | 0.020 | A | " |
| 3 | Talc (0.5) | 0.021 | A | " |
| 4 | Silica (0.1) | 0.024 | B - A | " |
| 5 | Silica (0.3) | 0.023 | A | " |
| 6 | Silica (0.5) | 0.022 | A | " |
| 7 | Silica (1.0) | 0.022 | A | " |
| Comp. Ex. 2 | None | 0.033 | C - B | uneven |

[1]Cell diameters of pre-expanded particles (as measured according to JIS K 6402)

| Symbol | Measurement |
|---|---|
| A | Less than 0.2 mm in mean cell diameter. |
| B | 0.2 mm to less than 0.5 mm in mean cell diameter. |
| C | Not less than 0.5 mm in mean cell diameter. |

EXAMPLE 7

One hundred parts (225 kg) of pellets the same as those used in Example 1 were dispersed in 300 parts of water in a pressure-resistant container having a capacity of 1000 liters and a stirrer, in the presence of 0.5 part of powdery basic calcium tertiary phosphate and 0.025 part of sodium dodecylbenzenesulfonate serving as dispersants. The container was evacuated by a vacuum pump with stirring, 30 parts of dichlorodifluoromethane was then added to the dispersion, and the mixture was heated to 136° C. At this time the container had an internal pressure of 26 kg/cm² gauge. Subsequently, while maintaining the internal temperature and pressure at 26 kg/cm² by forcing in liquid dichlorodifluoromethane under the control of a valve, a release valve at the bottom of the container was opened to release the mixture of pellets and water into the atmosphere of normal pressure through an orifice, 4 mm in diameter (12.57 mm²), in an orifice plate attached to the rear end of the release valve. The release of the mixture took about 30 minutes. The expanded particles obtained by the release were 0.0298 g/cm³ in average density, with a predominant portion thereof within the density range of from 0.028 to 0.032 g/cm³, and thus, in other words were minimized in the variation of expansion degree. No reduction of the expansion degree occurred toward the end of the releasing procedure and also no significant variation of cellular structure occured during the procedure.

COMPARISON EXAMPLE 3

The procedure of Example 7 was repeated except that the internal pressure of the container was maintained at 26 kg/cm² by forcing in pressurized $N_2$ in place of liquid diclorodifluoromethane under the control of the valve. During a period of 30 minutes which was required for the release of particles, the average density of pre-expanded particles increased from 0.0294 g/cm³ to 0.0514 g/cm³ with the variation of the cellular structure.

EXAMPLE 8

The pre-expanded particles 0.0298 g/cm³ in average density and obtained in Example 7 were dried at 60° C. for 24 hours, then subjected to air pressure of 9 kg/cm² gauge at 60° C., thereafter placed into a mold measuring 950×645×65 mm and heated for molding with water vapor at a pressure of 2.8 kg/cm² gauge. The molded product obtained was 0.0198 g/cm³ in density, smooth-surface and attractive in appearance, with the component particles effectively fused together.

What is claimed is:

1. A process for producing expanded particles of a polyolefin resin characterized by dispersing polyolefin resin particles 0.25 to 10 mm in particle size and a volatile blowing agent in water in the presence of a dispersant within a pressure-resistant container, heating the mixture at a temperature within the range of from the melting point of crystals of the resin minus 25° C. to the melting point plus 10° C. to impregnate the resin particles with the blowing agent, and releasing the mixture of the particles and water into a low-pressure zone through at least one orifice having an area of 0.07 to 300 mm² while maintaining the interior of the container at a constant temperature and constant pressure.

2. A process as defined in claim 1 wherein the orifice is formed in an orifice plate.

3. A process as defined in claim 1 wherein the interior of the container is maintained at constant pressure, and the partial pressure of the volatile blowing agent in the interior vapor-phase portion of the container is also maintained at a constant level.

4. A process as defined in claim 1 wherein a fine powder of sparingly water-soluble inorganic substance and an anionic surfactant are used conjointly as dispersion stabilizers.

5. A process as defined in claim 1 wherein the polyolefin resin is selected from the group consisting of low-density polyethylene, straight-chain low-density polyethylene, medium-density polyethylene, high-density polyethylene, ethylene-vinyl acetate copolymer, polypropylene, ethylene-propylene random copolymer, ethylene-propylene block copolymer and ethylene-propylene-butene terpolymer.

6. A process as defined in claim 5 wherein the polyolefin resin contains 0.01 to 5 parts by weight of an inorganic nucleating agent per 100 parts by weight of the polyolefin resin.

7. A process as defined in claim 5 wherein the polyolefin resin is ethylene-propylene random copolymer having an ethylene content of 1 to 15% by weight and MI of 0.1 to 40.

* * * * *